UNITED STATES PATENT OFFICE.

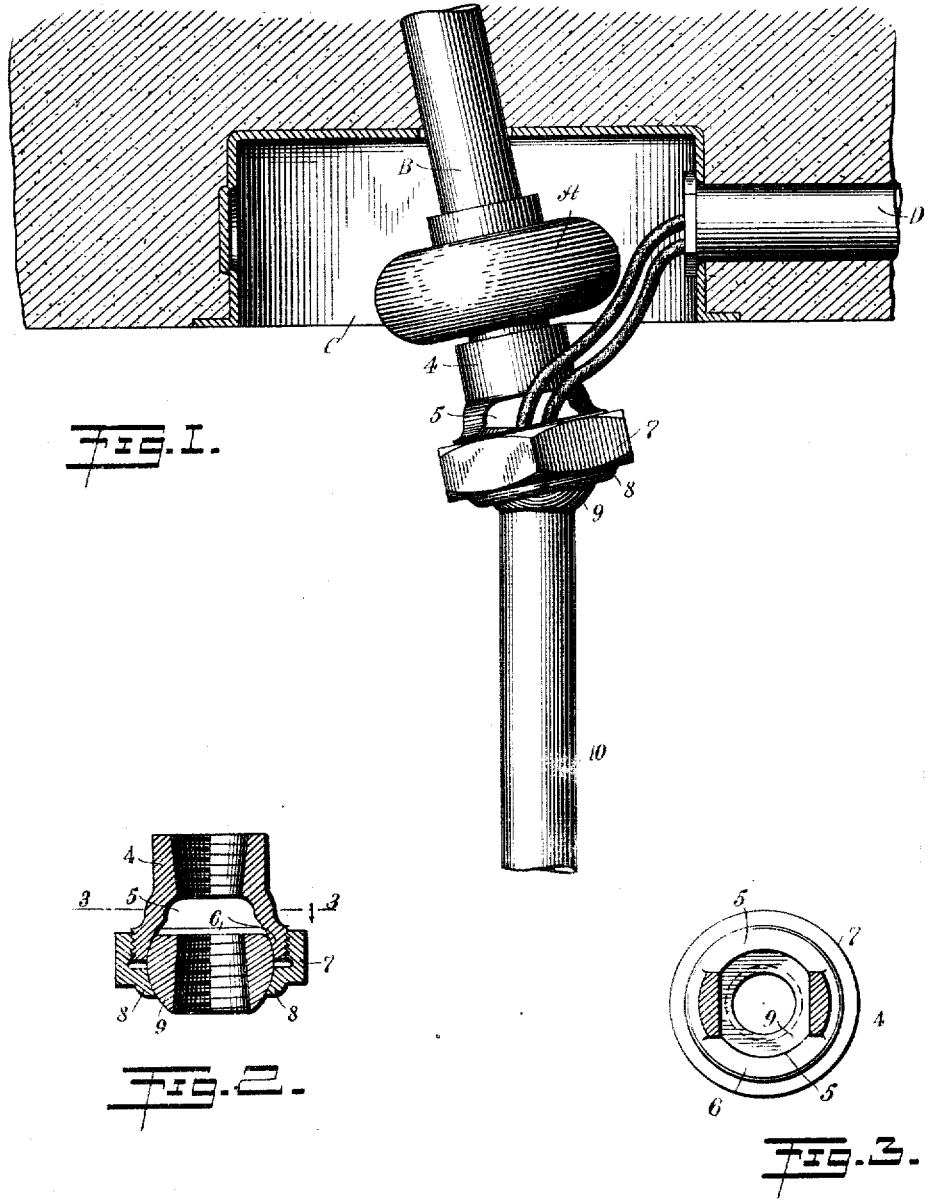

JOHN T. BARTLEY, OF JERSEY CITY, NEW JERSEY.

COUPLING FOR ELECTRIC FIXTURES.

1,017,368.  Specification of Letters Patent. Patented Feb. 13, 1912.

Application filed June 15, 1910. Serial No. 566,992.

*To all whom it may concern:*

Be it known that I, JOHN T. BARTLEY, a citizen of the United States, and a resident of Jersey City, in the county of Hudson and State of New Jersey, have invented a new and Improved Coupling for Electric Fixtures, of which the following is a full, clear, and exact description.

Among the principal objects which the present invention has in view are: to provide a hanging coupling device for electric fixtures which will, in accordance with the city ordinances, permit the lead wires to pass outside of the hanging device between the conduit and fixture; to provide a hanger for electric fixtures which will accommodate the angularity of disposition of the structure to. which it is connected, and thereby permit the fixture to be centered by moving the structural device to which said fixture is attached; and to provide a device of the character specified which is simple, efficient, economical and durable.

One embodiment of the present invention is disclosed in the structure illustrated in the accompanying drawings, in which like characters of reference denote corresponding parts in all the views, and in which—

Figure 1 is a fragmentary view in side elevation of an electrolier and hanger therefor, showing the junction formed by a coupling constructed and arranged in accordance with the present invention; Fig. 2 is a vertical cross section of a coupling constructed and arranged in accordance with the present invention; and Fig. 3 is a cross section taken on the line 3—3 in Fig. 2.

In many cities, and particularly in the city of New York, the fire ordinances controlling the installation of wiring systems in buildings where electroliers are installed, provide that the lead wires shall be exposed between the electrolier and the conduits in which the said wires are run. It is to conform with the law, and at the same time facilitate the running of the wires, that I have provided in the collar 4 lateral openings 5, 5. The openings 5, 5 extend between the neck of the collar 4 and the ring 6 thereof. The collar 4 is tapped to form the internal screw threads shown in Fig. 2 of the drawings, wherewith the collar is attached to any suitable form of insulating joint A. The ring 6 is provided with internal screw threads to receive in threaded engagement clamp ring 7, the lower extension 8 whereof is centrally extended to form a support for a ball joint 9.

The ball joint 9 is provided with a central opening which is tapped with a screw thread for mounting upon the main pipe 10 of the electrolier. The ball 9 is flattened at the upper end to near the median line of the said ball. The flattened portion extends below the openings 5 so that the said openings are not crowded or restricted by the ball 9.

When installing a wiring system in which is employed the coupling ring shown and described, the operation is as follows: The main pipe 10 of the electrolier has screwed thereon a ball 9. The gas pipe, or other anchoring device B is provided with an insulating joint A of any approved or known type. The pipe B is extended through a junction box C, extending through the upper and central opening thereof. The junction box is placed with reference to the centralizing of the electrolier, the pipe B being twisted or bent laterally for this purpose. From a lateral opening in the junction box is extended the conduit or insulating portion of the tube D. The box C, having been secured in position, the collar 4 is secured on the insulating joint A, provision being made in the terminal of the said joint to receive the said collar. Prior to securing the ball 9 upon the main pipe 10 the ring 7 is slipped over the said pipe, so that after the ball is secured in position the ring 7 may be slipped upward in engaging relation with the said ball. The interior of the ring 6, and the extension of the ring 7, are cast to form a socket for the ball 9. The fixture is now raised until the ball 9 is seated within the ring 6. With the main pipe 10 hanging plumb, the ring 7 is adjusted to engage the threads in the ring 6 when the said ring 7 is secured on to the ring 6, clamping the ball 9 in holding position. The joint formed by the rings 6 and 7 with the ball 9 permits the plumbing of the electrolier in position with relation to the angular disposition of the pipe B. When the pipe 10 is so plumbed, the ring 7 is closed so that the ball 9 is rigidly jammed between the rings 6 and 7. When now the wiring is run with fixtures thus hung, the wires may be threaded in the conduit and be brought out of the conduit at the junction box C. The wires are then threaded downward through the electrolier, or if required, the wiring of the electrolier is joined in the open space between the ball 9 and the conduit D. The wires, in passing out of or into the pipe 10 of the electrolier, extend through the openings 5, 5. By means of this construction and arrangement the ordinances above referred to are conformed to.

Having thus described my invention, what I claim as new and desire to secure by Letters Patent is:—

1. A coupling for electric fixtures comprising a collar having an internally threaded neck portion and an externally threaded ring portion, said portions being connected by a spider construction, the inner side of said ring portion being further shaped to form a half socket for the ball-joint; a clamping collar having a neck portion screw threaded to engage the threads on said ring portion, said collar being shaped to form a segmental socket for a ball; and a ball having a tapered perforation therethrough to receive an electrolier pipe.

2. A coupling for electric fixtures comprising a collar having an internally threaded neck portion and an externally threaded ring portion, said portions being connected by a spider construction, the inner side of said ring portion being further shaped to form a half socket for the ball joint; a clamping collar having a neck portion screw threaded to engage the threads on said ring portion, said collar being shaped to form a segmental socket for a ball; a ball having a tapered perforation therethrough to receive an electrolier pipe, and a swinging support for said collar adapted to be disposed at various angles.

In testimony whereof I have signed this specification in the presence of two subscribing witnesses.

JOHN T. BARTLEY.

Witnesses:
E. F. MURDOCK.
JOHN P. DAVIS.